United States Patent
Jeong et al.

(10) Patent No.: US 11,516,690 B2
(45) Date of Patent: Nov. 29, 2022

(54) SIDELINK MEASUREMENTS IN V2X COMMUNICATION

(71) Applicant: Samsung Electronics Co., Ltd., Suwon-si (KR)

(72) Inventors: Kyeongin Jeong, Allen, TX (US); Hongbo Si, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/170,649

(22) Filed: Feb. 8, 2021

(65) Prior Publication Data

US 2021/0250798 A1 Aug. 12, 2021

Related U.S. Application Data

(60) Provisional application No. 62/975,638, filed on Feb. 12, 2020, provisional application No. 62/987,820, filed on Mar. 10, 2020.

(51) Int. Cl.
*H04W 24/10* (2009.01)
*H04W 80/04* (2009.01)
(Continued)

(52) U.S. Cl.
CPC ....... *H04W 24/10* (2013.01); *H04W 74/0808* (2013.01); *H04W 76/27* (2018.02); *H04W 80/02* (2013.01); *H04W 80/04* (2013.01)

(58) Field of Classification Search
None
See application file for complete search history.

(56) References Cited

U.S. PATENT DOCUMENTS

| 2014/0287694 A1 | 9/2014 | Kim et al. |
| 2020/0007195 A1 | 1/2020 | Yiu |

(Continued)

FOREIGN PATENT DOCUMENTS

| CN | 110177386 A | 8/2019 |
| KR | 10-1983284 B1 | 9/2019 |

OTHER PUBLICATIONS

International Search Report and Written Opinion of the International Searching Authority in connection with International Application No. PCT/KR2021/001830 dated May 27, 2021, 11 pages.

(Continued)

*Primary Examiner* — Diane L Lo

(57) ABSTRACT

Methods and apparatuses in a wireless communication system. A method of operating a user equipment (UE) includes storing a previous layer 3 (L3) filtered measurement result; receiving L3 filtering configuration information including a first filter coefficient value (k) and a first filtering window value; identifying a generation time instance of the previous L3 filtered measurement result; identifying the first filter coefficient value (k) and the first filtering window value included in the L3 filtering configuration information; in response to receiving a latest measurement result from a lower layer, determining whether the generation time instance of the previous L3 filtered measurement result was obtained within a time window that is a function of a first time instance and a second time instance; and performing an L3 filtering operation to trigger a measurement report based on a result of the determination.

20 Claims, 8 Drawing Sheets

(51) Int. Cl.
　　　*H04W 74/08*　　(2009.01)
　　　*H04W 76/27*　　(2018.01)
　　　*H04W 80/02*　　(2009.01)

(56) References Cited

U.S. PATENT DOCUMENTS

| | | | | |
|---|---|---|---|---|
| 2020/0154326 | A1* | 5/2020 | Deenoo | H04W 36/08 |
| 2021/0051500 | A1* | 2/2021 | Chae | H04W 24/08 |
| 2021/0051510 | A1* | 2/2021 | Chae | H04B 17/309 |
| 2021/0219248 | A1* | 7/2021 | Wu | G04R 20/02 |
| 2021/0337497 | A1* | 10/2021 | Siomina | H04J 11/0079 |
| 2021/0385751 | A1* | 12/2021 | Lee | H04W 52/0245 |

OTHER PUBLICATIONS

Ericsson, "On performing L3 filtering of NR related measurements" 3GPP TSG-RAN2 Meeting #108, R2-1915426, Reno, USA, Nov. 18-22, 2019, 3 pages.

Catt, "Summary #2 of UE and gNB measurements for NR Positioning", 3GPP TSG RAN WG1 #99, R1-1913447, Reno, Nevada, USA, Nov. 18-22, 2019, 24 pages.

"5G; NR; Physical layer procedures for control (3GPP TS 38.213 version 15.7.0 Release 15)", ETSI TS 138 213 V15.7.0, Oct. 2019, 112 pages.

"3rd Generation Partnership Project; Technical Specification Group Radio Access Network; NR; Physical layer measurements, (Release 15)", 3GPP TS 38.215 V15.5.0, Jun. 2019, 16 pages.

"5G; NR; Physical layer procedures for data (3GPP TS 38.214 version 15.7.0 Release 15)", ETSI TS 138 214 V15.7.0, Oct. 2019, 108 pages.

"5G; NR; Radio Resource Control (RRC); Protocol specification (3GPP TS 38.331 version 15.7.0 Release 15)", ETSI TS 138 331 V15.7.0, Oct. 2019, 523 pages.

"3rd Generation Partnership Project; Technical Specification Group Radio Access Network; NR; Medium Access Control (MAC) protocol specification (Release 15)", 3GPP TS 38.321 V15.10.0, Sep. 2020, 79 pages.

"3rd Generation Partnership Project; Technical Specification Group Radio Access Network; NR; Study on NR Vehicle-to-Everything (V2X) (Release 16)", 3GPP TR 38.885 V16.0.0, Mar. 2019, 122 pages.

* cited by examiner

SIDELINK MEASUREMENTS IN V2X COMMUNICATION

CROSS-REFERENCE TO RELATED APPLICATIONS AND CLAIM OF PRIORITY

The present application claims priority to U.S. Provisional Patent Application No. 62/975,638, filed on Feb. 12, 2020 and U.S. Provisional Patent Application No. 62/987,820, filed on Mar. 10, 2020. The content of the above-identified patent document is incorporated herein by reference.

TECHNICAL FIELD

The present disclosure relates generally to wireless communication systems and, more specifically, the present disclosure relates to sidelink measurements in vehicle-to-everything (V2X) communication.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates sidelink measurements in V2X communication.

In one embodiment, a user equipment (UE) in a wireless communication system is provided. The UE comprises memory configured to store a previous layer 3 (L3) filtered measurement result and a transceiver operably connected to the memory, the transceiver is configured to receive L3 filtering configuration information including a first filter coefficient value (k) and a first filtering window value. The UE further comprises a processor operably connected to the transceiver, the processor configured to: identify a generation time instance of the previous L3 filtered measurement result; identify the first filter coefficient value (k) and the first filtering window value included in the L3 filtering configuration information; in response to receiving a latest measurement result from a lower layer, determine whether the generation time instance of the previous L3 filtered measurement result was obtained within a time window that is a function of a first time instance and a second time instance; and perform an L3 filtering operation to trigger a measurement report based on a result of the determination.

In another embodiment, a UE in a wireless communication system is provided. The UE comprises a transceiver configured to receive measurement configuration information. The UE further comprises a processor operably connected to the transceiver, the processor is further configured to: identify a first indicator included in the measurement configuration information, the first indicator indicating whether a system frame number (SFN) is included in a measurement report; determine, based on the first indicator included in the measurement configuration information, whether the SFN is included in the measurement report; and generate the measurement report based on a determination that the SFN is included in the measurement report, wherein the SFN is a current SFN that is determined when the measurement report is generated.

In yet another embodiment, a method of a UE in a wireless communication system is provided. The method comprises: storing a previous L3 filtered measurement result; receiving L3 filtering configuration information including a first filter coefficient value (k) and a first filtering window value; identifying a generation time instance of the previous L3 filtered measurement result; identifying the first filter coefficient value (k) and the first filtering window value included in the L3 filtering configuration information; in response to receiving a latest measurement result from a lower layer, determining whether the generation time instance of the previous L3 filtered measurement result was obtained within a time window that is a function of a first time instance and a second time instance; and performing an L3 filtering operation to trigger a measurement report based on a result of the determination.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 10, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.213 v15.7.0, "NR; Physical Layer Procedures for Control"; 3GPP TS 38.215 v.15.5.0: "Physical layer measurements"; and 3GPP TS 38.214 v15.7.0, "NR; Physical Layer Procedures for Data"; 3GPP TS 38.331 v.15.7.0, "Radio Resource Control (RRC) protocol specification"; 3GPP TS 38.321 v15.10.0, "Medium Access Control (MAC) protocol specification"; and 3GPP TR 38.885 v.16.0.0: "Study on NR Vehicle-to-Everything (V2X)."

Figure 1:
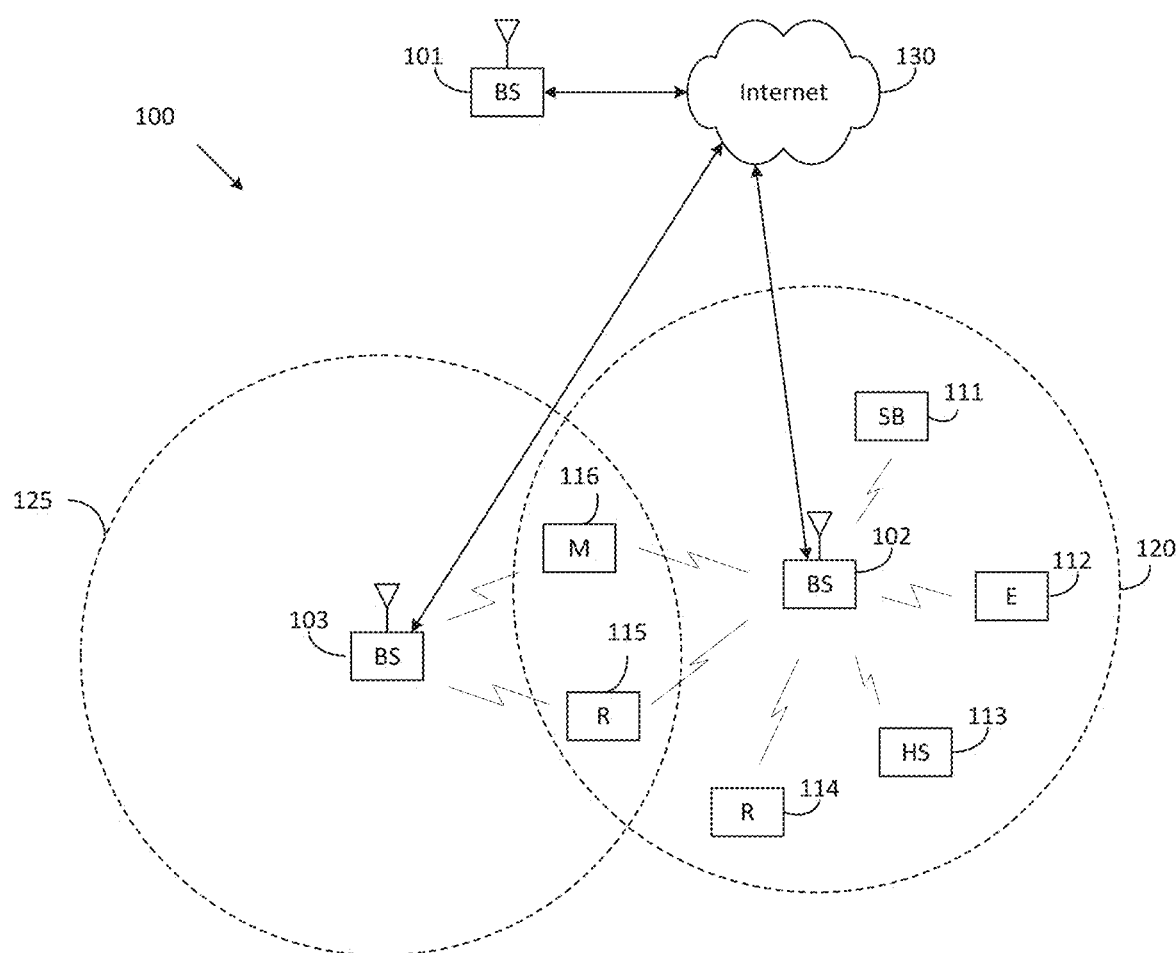
FIG. 1 illustrates an example wireless network according to embodiments of the present disclosure.
Figure 2:
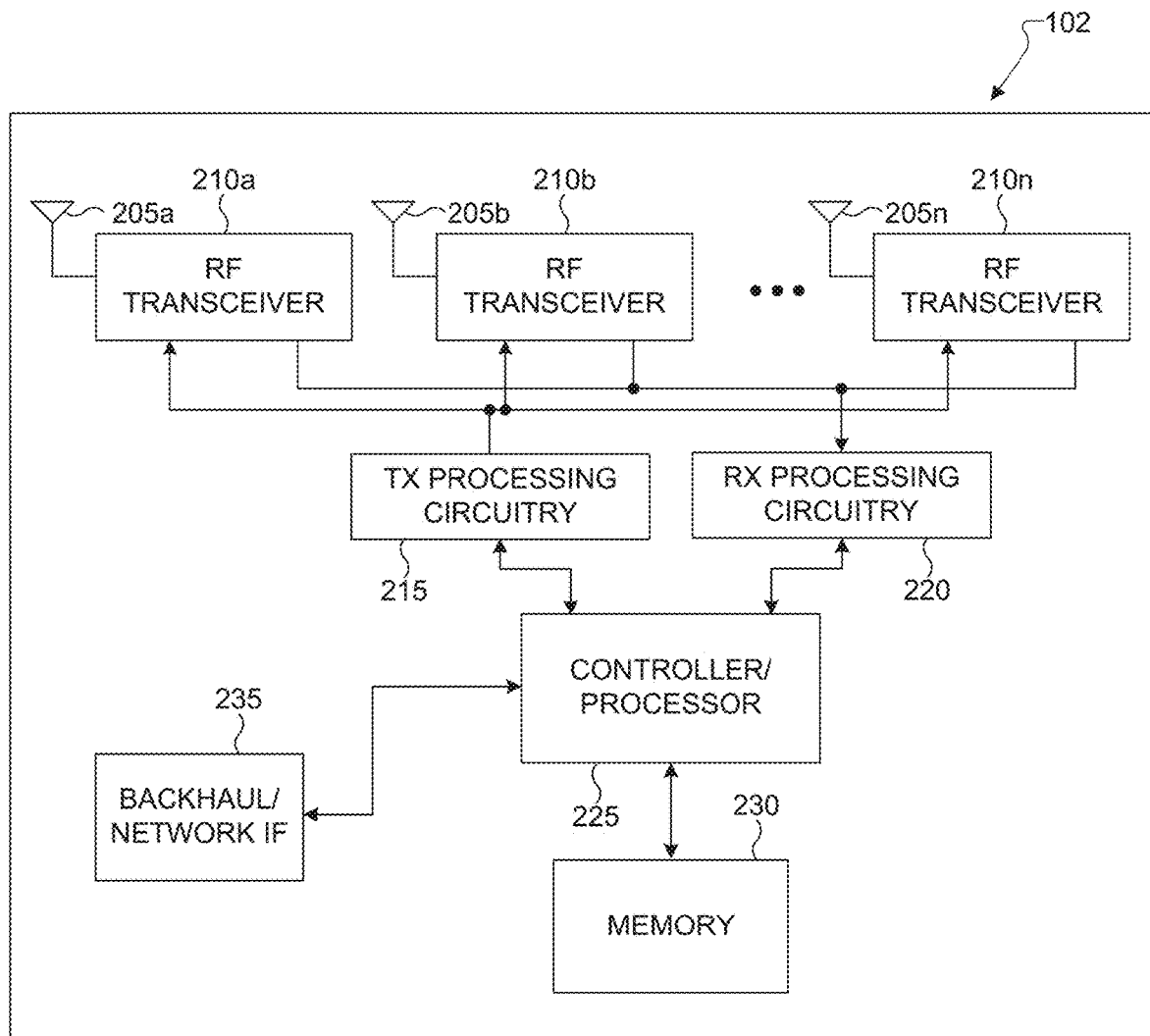
FIG. 2 illustrates an example gNB according to embodiments of the present disclosure.
Figure 3:
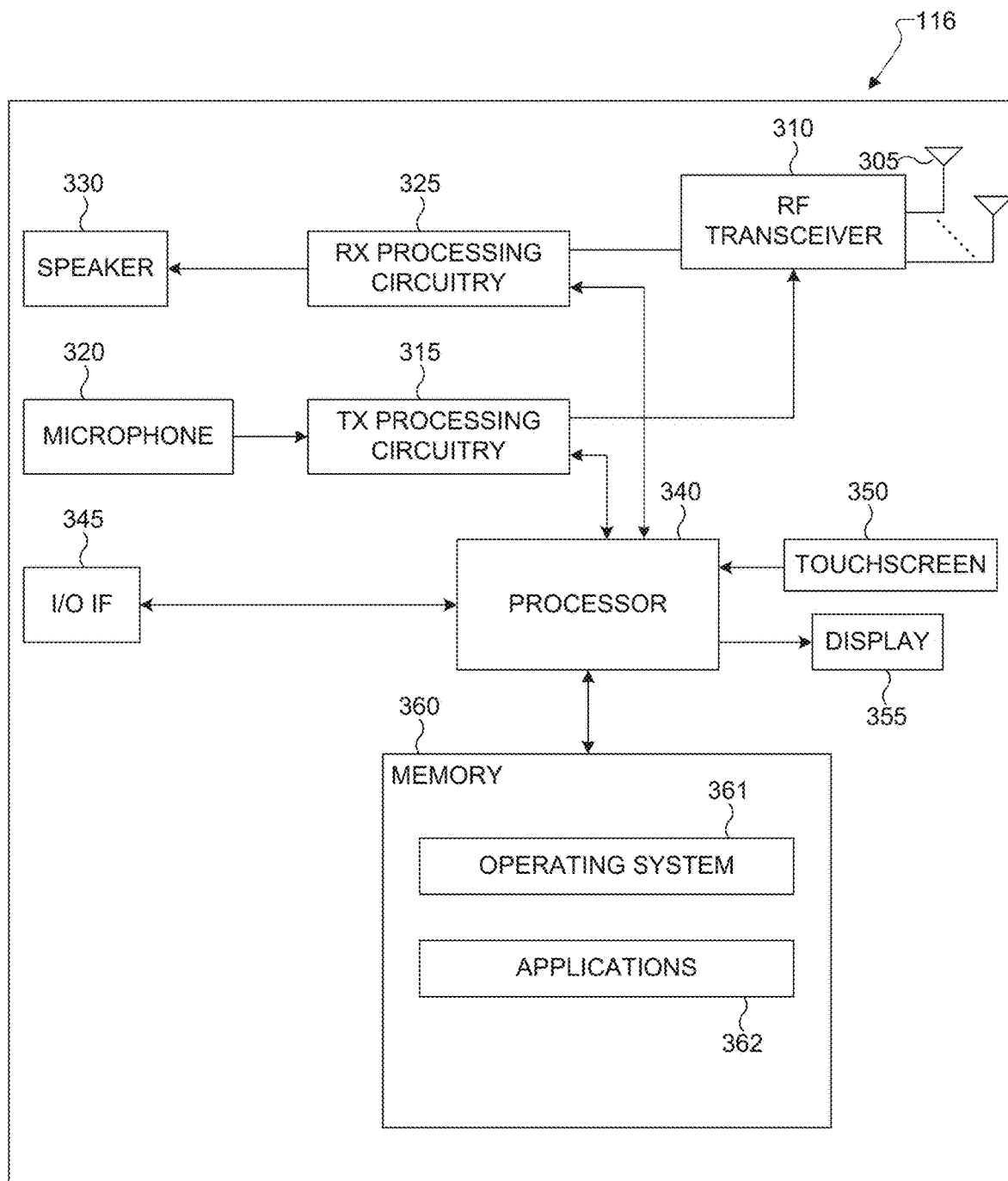
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of UEs within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3rd generation partnership project (3GPP) NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for sidelink measurements in V2X communication. In certain embodiments, and one or more of the gNBs 101-103 includes circuitry, programing, or a combination thereof, for beam management and coverage enhancements for sidelink measurements in V2X communication.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, 5G/NR communication systems have been developed and are currently being deployed. The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

The discussion of 5G systems and frequency bands associated therewith is for reference as certain embodiments of the present disclosure may be implemented in 5G systems. However, the present disclosure is not limited to 5G systems or the frequency bands associated therewith, and embodiments of the present disclosure may be utilized in connection with any frequency band. For example, aspects of the present disclosure may also be applied to deployment of 5G communication systems, 6G or even later releases which may use terahertz (THz) bands.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide CSI to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
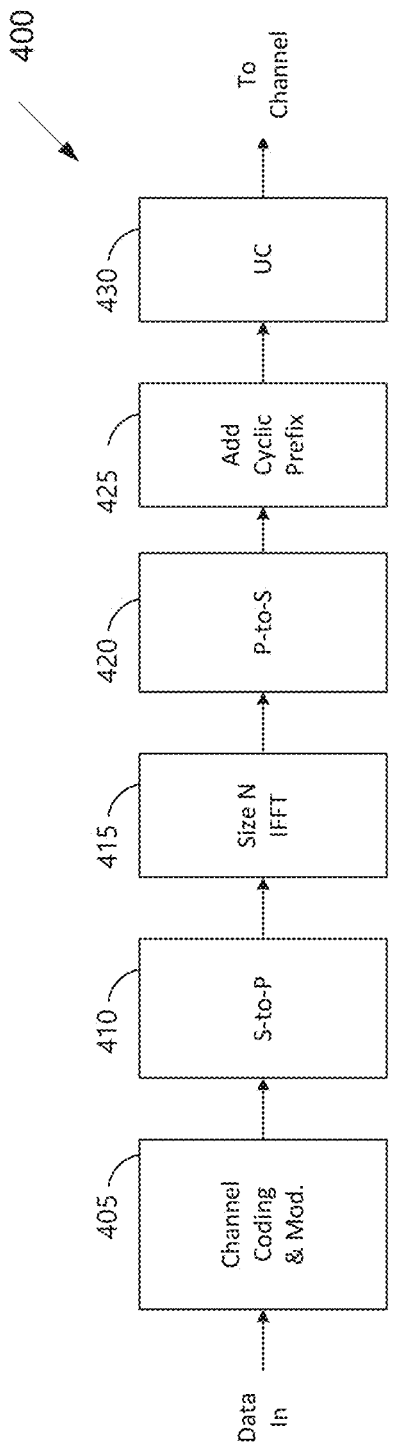
FIGS. 4 and 5 illustrate example wireless transmit and receive paths according to this disclosure.
Figure 5:
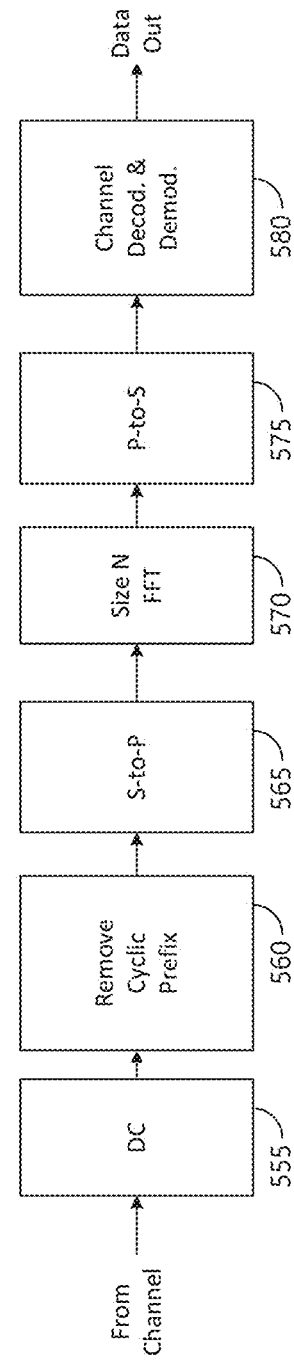

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support sidelink measurements in V2X communication as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNBs 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

In 3GPP wireless standards, NR has been being discussed as a 5G wireless communication. One of NR features under the discussion is V2X.

Figure 6:
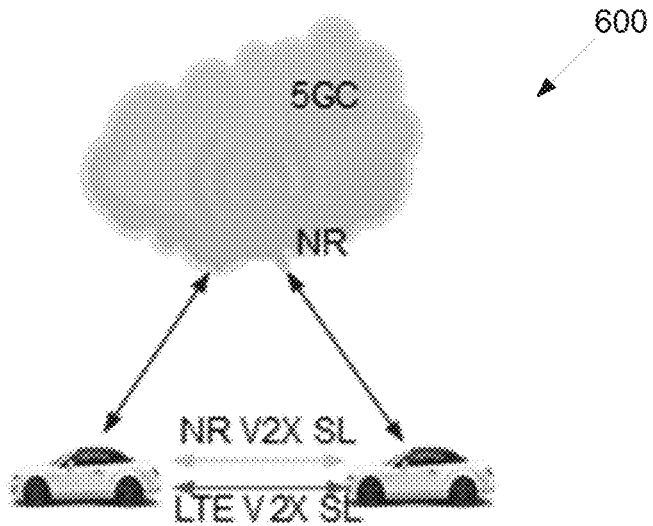
FIG. 6 illustrates an example V2X communication over sidelink according to embodiments of the present disclosure.

FIG. 6 illustrate an example V2X communication over sidelink 600 according to embodiments of the present disclosure. An embodiment of the V2X communication over sidelink 600 shown in FIG. 6 is for illustration only.

FIG. 6 illustrates an example scenario of vehicle to vehicle communication. Two or multiple vehicles can transmit and receive data/control over direct link/interface between vehicles. The direct link/interface between vehicles or between vehicle and other things is named as a sidelink (SL) in 3GPP. Note that the FIG. 6 describes the scenario where the vehicles still can communicate with a gNB in order to acquire SL resources, SL radio bearer configurations, etc., however it is also possible even without interaction with the gNB, vehicles still communicate each other over the SL. In the case, the SL resources, the SL radio bearer configurations, etc., are preconfigured (e.g., via V2X server or any other core network entity).

For more detailed V2X scenarios and studies are captured in LTE standard specification.

One of differences compared to downlink (e.g., a link from a gNB to a UE) is the reference signal for measurements. SL measurements can be reference signal received power, reference signal received pathloss, reference signal received quality, or reference signal time difference and the SL measurements can be used for the SL power control, SL radio link failure detection/determination between UEs, or group managements (e.g., for platooning use case), etc.

However, unlike a DL, a SL reference signal to be measured is not transmitted periodically. A SL reference signal is sent only when SL data/control information is transmitted to the destined UE(s).

For DL measurements, a layer 3 (L3) filtering is applied to average the latest measurement result and the old measurement result. It is to relief a sharp radio fluctuation or a fast shadow condition, etc., by consideration of old measurement result also. TABLE 1 shows an L3 filtering operation.

TABLE 1

L3 filtering

The UE may:
1> for each cell measurement quantity and for each beam measurement quantity that the UE performs measurements:
2> filter the measured result, before using for evalutation of reporting criteria or for measurement reporting, by the following formula:
$F_n = (1 - a)*F_{n-1} + a*M_n$
where
$M_n$ is the latest received measurement result from the physical layer;
$F_n$ is the updated filtered measurement result, that is used for evaluation of reporting criteria or for measurement reporting;
$F_{n-1}$ is the old filtered measurement result, where $F_0$ is set to $M_1$ when the first measurement result from the physical layer is received; and for NR, $a = 1/2^{(ki/4)}$, where $k_i$ is the filterCoefficient for the corresponding measurement quantity of the i: th QuantityConfigNR in quantityConfigNR-List, and i is indicated by quantityConfigIndex in MeasObjectNR; for E-UTRA, $a = 1/2^{(k/4)}$, where k is the filterCoefficient for the corresponding measurement quantity received by quantityConfigEUTRA in the quantityConfig;
2> adapt the filter such that the time characteristics of the filter are preserved at different input rates, observing that the filterCoefficient k assumes a sample rate equal to X ms; The value of X is equivalent to one intra-frequency L1 measurement period as defined in 3GPP TS 38.133 assuming non-DRX operation, and depends on frequency range.

NOTE 1:
If k is set to 0, no layer 3 filtering is applicable.
NOTE 2:
The filtering is performed in the same domain as used for evaluation of reporting criteria or for measurement reporting, i.e., logarithmic filtering for logarithmic measurements.
NOTE 3:
The filter input rate is implementation dependent, to fulfil the performance requirements set in 3GPP TS 38.133. For further details about the physical layer measurements, see 3GPP TS 38.133.

The technical change in V2X is how to apply L3 filtering to the measurements in the condition where SL reference signal for measurements is not periodically transmitted (i.e., SL reference signal for measurements is transmitted only when SL data/control information is transmitted to the destined UE(s)).

In one example, a kind of window is provided for the UE to determine whether L3 filtering is applied to the old measurement result or not. For example, if the old L3 filtered measurement result was made within the window length from the time of the latest received measurement result from the physical layer, the UE applies L3 filtering into both the old L3 filtered measurement result and the latest received measurement result from the physical layer.

Otherwise, if the old L3 filtered measurement result was made before than [time of the latest received measurement result from the physical layer–a window length], the UE considers only the latest received measurement result from the physical layer. As alternative, it means if the old L3 filtered measurement result was made before than [time of the latest received measurement result from the physical layer–a window length], the UE applies the value "0" to k (filterCoefficient) in the above L3 filtering equation.

Note that k (filterCoefficient) value is configured or preconfigured by network (e.g., a gNB or other core network control entity), so in the first case (if the old L3 filtered measurement result was made within the window length from the time of the latest received measurement result from the physical layer) the UE applies the configured or preconfigured value to k. This window length can be also configured or preconfigured by network (e.g., a gNB or other core network entities. As alternative, this window length can be also specified as fixed value in the specification.

Figure 7:
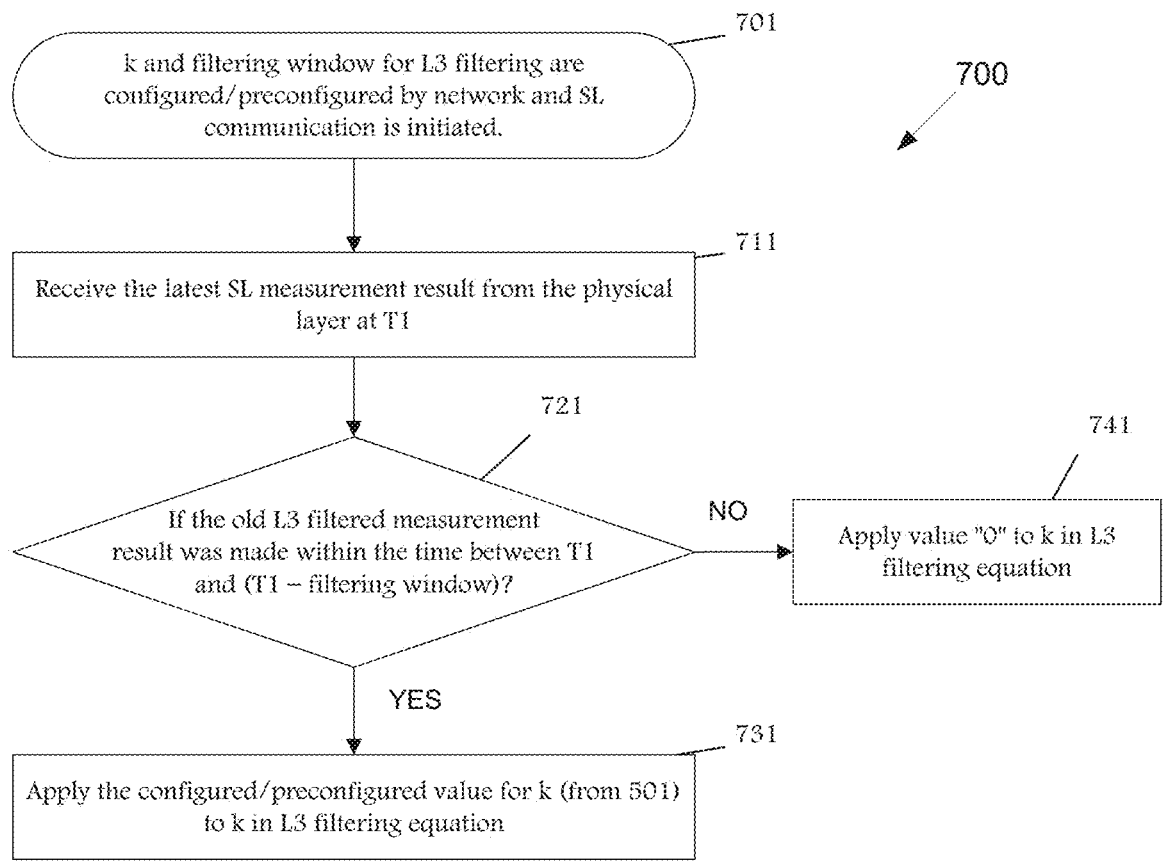
FIG. 7 illustrates a flowchart of a method of a UE for V2X communication over SL according to embodiments of the present disclosure.

FIG. 7 illustrates a flowchart of a method 700 of a UE for V2X communication over SL according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

As illustrated in FIG. 7, the UE receives the required configuration (e.g., a value of k (filterCoefficient) and value of filtering window) for this embodiment from the network. For example, a value of filtering window can be X [ms] or X [s]. The network can be either a gNB or other core network control entities (e.g., a V2X server, a NR control function in core network, etc.), and the SL communication is initiated at step 701. Once the SL communication is initiated, for a given source or destination UE the reference signal for measurements is also transmitted when SL data/control information is transmitted. It can be DMRS of SL data/control channel, however in this embodiment there is no restriction which SL RS or channel to be used for measurements.

Once layer 3 (or RRC) receives the latest SL measurement result from the physical layer at T1 (T1: the timing when the latest SL measurement result from the physical layer is received) at step 711, the UE checks if the old L3 filtered measurement result was made within the time/duration between T1 and (T1–filtering window) at step 721. If the old L3 filtered measurement result was made within the time/duration between T1 and (T1–filtering window), the UE applies the configured or preconfigured value for k, which is derived from step 701, to k in L3 filtering equation at step 731. Otherwise, if old L3 filtered measurement result is not available or if old L3 filtered measurement result was made before (T1–filtering window), the UE applies value "0" to k in L3 filtering equation. With this embodiment, the UE can exclude too old L3 filtered measurement result in L3 filtering operation, so the actual updated L3 filtered measured result becomes more accurate.

In one embodiment, a base station may configure two layer 3 filter coefficient values (instead of single value of layer 3 filter coefficient value) in addition to the filtering window as aforementioned embodiments/examples.

In such embodiment, a UE applies the first layer 3 filter coefficient value into layer 3 filtering operation if the old layer 3 filtered measured result was derived between the current time and (the current time–filtering window). Otherwise, the UE applies the second layer 3 filter coefficient value into layer 3 filtering operation.

One of NR features under the NR standard is NR-U (e.g., NR-based access to unlicensed spectrum). NR-U is to enable NR radio access operating with shard spectrum channel access. Since unlicensed spectrum may be shared with other radio access technology (e.g., wireless LAN (WLAN), etc.), the gNB and UE may apply listen-before-talk (LBT) before performing a transmission on NR-U cells. When LBT is applied, the transmitter listens to/senses the channel to determine whether the channel is free or busy and performs transmission only if the channel is sensed free.

One of issues from an LBT operation is the UE measurement reporting on the serving cell(s) and neighboring cells' radio channel conditions. According to the measurement reporting configuration by a gNB, the UE performs measurements on the serving(s) and neighboring cells, includes the latest available measured results on them into measurement reporting message and transmits the measurement reporting to the gNB. Measured channel from the serving cell(s) and neighboring cells can be synchronization signal block (SSB) or channel state information-reference signal (CSI-RS) that configured by the gNB.

In NR-U due to an LBT operation, the measurement reporting may be transmitted too late (e.g., the UE cannot find out available channel for a while in the sensing) once the UE sets the measurement reporting which included the measured results for the serving cell(s) and neighboring cells. This late measurement reporting may provide out-of-dated measurement results to the gNB, so it may cause inappropriate consequence. For example, the gNB may command a handover the UE to the cell according to the out-of-dated measured results in the measurement reporting although the target cell for handover may not be the best cell now.

In one example, a current SFN information is provided when the UE sets measured results on the serving cell(s) and neighboring cells into the measurement reporting or when the UE sets measurement reporting message to be transmitted (or when the UE generates measurement reporting message to be sent). With the addition of the current SFN when the UE sets measured results on the serving cell(s) and neighboring cells into the measurement reporting or when the UE sets measurement reporting message to be transmitted (or when the UE generates measurement reporting message to be sent), the gNB can know whether the measured results included in the measurement reporting is out-of-dated or not when the gNB receives measurement reporting from the UE in NR-U. Instead of SFN information, another alternative is to add other type of time information instead of SFN (e.g., GNSS time information or GMT time stamp or time stamp from the reception of the latest measurement configuration by the gNB, etc.) with measured results on the serving cell(s) and neighboring cells in the measurement reporting.

In another example, the UE sends the time stamp information, for example time stamp between when the UE sets measured results on the serving cell(s) and neighboring cells into the measurement reporting (or when the UE sets measurement reporting message to be transmitted or when the UE generates measurement reporting message to be sent) and when the UE accesses the channel to transmit the measurement reporting message (or when the UE gets the radio resource grant to send measurement reporting or when the UE is generates a medium access control protocol data unit (MAC PDU) to be transmitted, together with measurement reporting message.

The time stamp information can be sent by a MAC-control element (MAC-CE). This time stamp information can be expressed as the elapsed time information (e.g., elapsed number of microseconds or milliseconds or seconds or elapsed number of slots or subframes or frames, etc.) or as the indication to report whether the measurement reporting is out-of-dated or not.

For the indication, the gNB may configure the elapsed time information (e.g., elapsed number of microseconds or milliseconds or seconds or elapsed number of slots or subframes or frames, etc.) when the UE considers the measurement reporting is out-of-dated. For example, if the time duration between when the UE sets measured results on the serving cell(s) and neighboring cells into the measurement reporting (or when the UE sets measurement reporting message to be transmitted or when the UE generates measurement reporting message to be sent) and when the UE accesses the channel to transmit the measurement reporting message (or when the UE generates MAC PDU to be sent) exceeds the configured elapsed number of subframes, the UE sets the indication (e.g., sets to "1") to report the measurement reporting is out-of-dated. Otherwise, the UE sets the indication (e.g., sets to "0") to report the measurement reporting is valid one.

Figure 8:
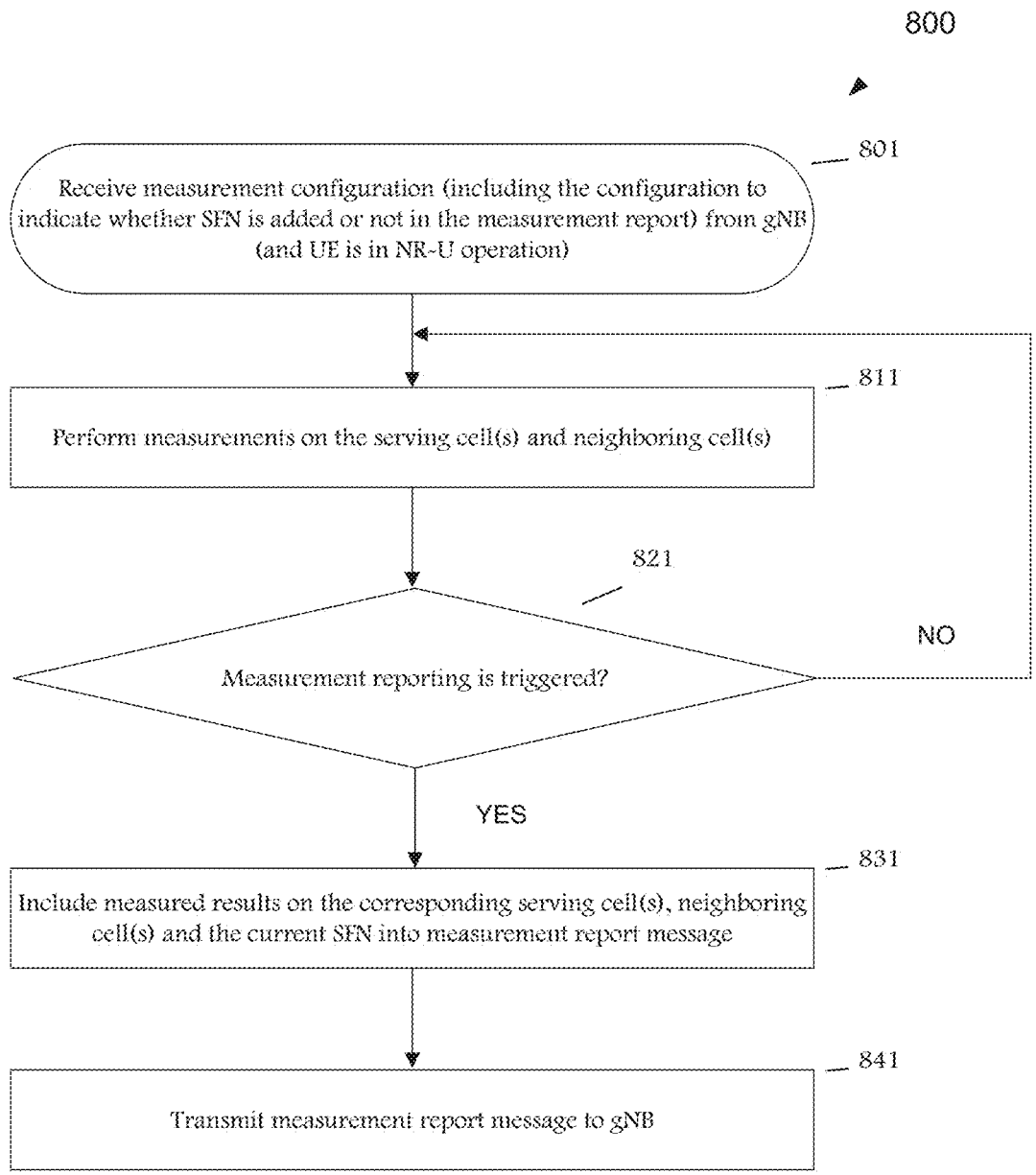
FIG. 8 illustrates a flowchart of a method of a UE for enhanced measurement report according to embodiments of the present disclosure.

FIG. 8 illustrates a flowchart of a method 800 of a UE for enhanced measurement report according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

FIG. 8 illustrates a method for enhanced measurement report. As illustrated in FIG. 8, the UE receives measurement configuration from the serving gNB at step 801. The measurement configuration can include the configuration to indicate whether SFN is added or not in the measurement report at step 801. The serving gNB can transmit the configuration in step 801 via the UE dedicated RRC message, e.g., a RRC connection reconfiguration message including measurement configuration. If the measurement configuration includes the configuration that configures the UE to add SFN in the measurement report, the UE includes the current SFN in addition to the measured results on the corresponding serving cell(s) and neighboring cell(s) into measurement report message at step 831.

If the measurement configuration does not include the configuration that configures the UE to add SFN in the measurement report or if the measurement configuration includes the configuration that configures the UE not to add SFN in the measurement report, the UE includes the measured results on the corresponding serving cell(s) and neighboring cell(s) without the current SFN into measurement report message at step 831. As an alternative, without separate configuration to indicate whether the SFN is added or not in the measurement report, the UE can implicitly determine whether SFN is added or not in the measurement report based on whether the UE is in NR-U operation or not at step 801.

If the UE operates for NR-U, it includes the current SFN in addition to the measured results on the corresponding serving cell(s) and neighboring cell(s) into measurement report message at step 831. If the UE doesn't operate for NR-U, the UE includes the measured results on the corresponding serving cell(s) and neighboring cell(s) without the current SFN into measurement report message at step 831.

In one example, the UE may always include the current SFN in addition to the measured results on the corresponding serving cell(s) and neighboring cell(s) into measurement report message at step 831. The UE performs measurements on the serving cell(s) and neighboring cell(s) according to the received measurement configuration at step 811. If measurement reporting is triggered, e.g., either by periodical measurement report or event-triggered measurement report, which are specified in 3GPP TS 38.331, the UE includes the measured results on the corresponding serving cell(s), neighboring cell(s) and the current SFN when the UE sets measured results on the serving cell(s) and neighboring cells into the measurement reporting.

Alternatively, the current SFN is the SFN when the UE sets measurement reporting message to be transmitted. Alternatively, the current SFN is the SFN when the UE generates measurement reporting message to be sent (e.g., steps 821 and 831). When the UE gets the radio resource allocation for UL transmission from the serving gNB, the UE transmits the measurement report message to the gNB at step 841. In NR-U operation, if the UE can access to the channel as the result of LBT or if the UE gests the radio resource allocation for UL transmission from the serving gNB as the result of LBT, the UE transmits the measurement report message to the gNB at step 841.

Figure 9:
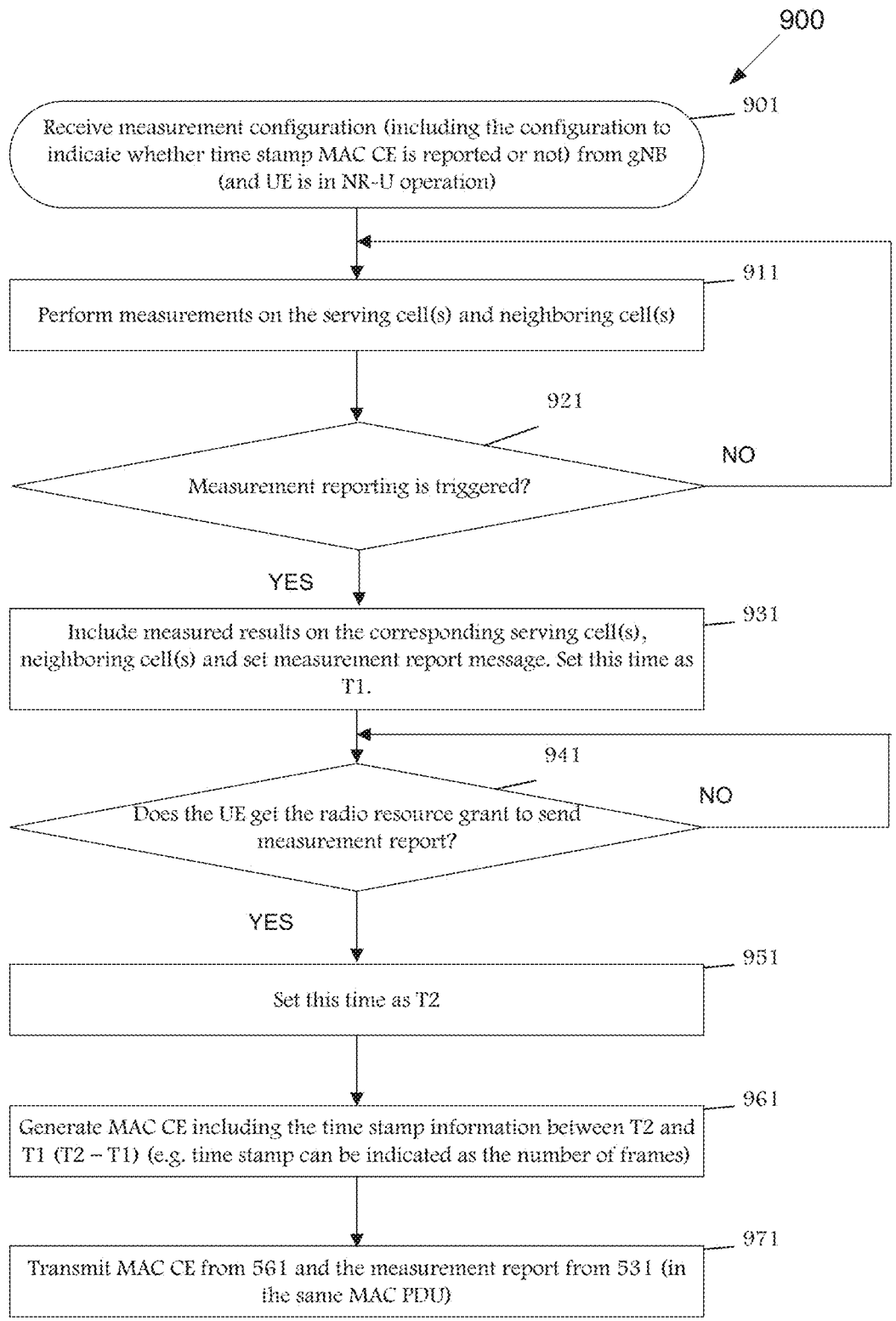
FIG. 9 illustrates another flowchart of a method of a UE for enhanced measurement report according to embodiments of the present disclosure.

FIG. 9 illustrates an example method 900 of a UE for enhanced measurement report according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

As illustrated in FIG. 9, the UE receives measurement configuration from the serving gNB at step 901. The measurement configuration can include the configuration to indicate whether MAC CE including the elapsed time stamp information between the time when the UE sets measured results on the serving cell(s) and neighboring cell(s) into the measurement reporting (or alternatively when the UE sets measurement reporting message to be sent or alternatively when the UE generates measurement reporting message to be sent) and the time when the UE accesses the channel to transmit the measurement reporting message (or alternatively when the UE gets the radio resource grant to send measurement reporting or alternatively when the UE is generates MAC PDU to be transmitted), together with measurement reporting message.

The serving gNB can transmit the configuration at step 901 via the UE dedicated RRC message, e.g., an RRC connection reconfiguration message including measurement configuration. If the measurement configuration includes the configuration that configures the UE to send the above provided MAC CE in addition to the measurement report message, the UE operates according to the illustrated at steps 911, 921, 931, 941, 951, 961, and 971 as illustrated in FIG. 9.

If the measurement configuration does not include the configuration that configures the UE to send the above provided MAC CE in addition to the measurement report message, the UE operates according to step 911 and 921, and only includes measured results on the corresponding serving cell(s), neighboring cell(s) and set measurement report message in 531, then only transmits measurement report message at step 971 as illustrated in FIG. 9.

As an alternative, without separate configuration to indicate whether the above provided MAC CE needs to be reported in addition to the measurement report message, the UE implicitly determine whether the MAC CE needs to be reported in addition to the measurement report message based on whether the UE is in NR-U operation or not at step 901. If the UE operates for NR-U, the UE operates according to the illustrated at steps 911, 921, 931, 941, 951, 961, and 971 in FIG. 9.

If the UE doesn't operate for NR-U, the UE operates according to step 911, 921 and only includes measured results on the corresponding serving cell(s), neighboring cell(s) and set measurement report message at step 931, then only transmits measurement report message at step 971 in FIG. 9. As an alternative, the UE may always operate according to the illustrated steps 911, 921, 931, 941, 951, 961, and 971. The UE performs measurement on the serving cell(s) and neighboring cell(s) according to the received measurement configuration at step 911.

If the measurement reporting is triggered, e.g., either by periodical measurement report or event-triggered measurement report, which are specified in 3GPP TS 38.331, the UE includes measured results on the corresponding serving cell(s), neighboring cell(s) and set measurement report message to be sent at step 931. The UE also sets/stores this time as T1 at step 931. Alternatively, T1 can be the time when the UE sets measurement reporting message to be sent or the time when the UE generates measurement reporting message to be sent. When the UE gets the radio resource allocation for UL transmission from the serving gNB, the UE sets this time as T2 (e.g., steps 941, 951).

Alternatively, T2 can be the time when the UE generates MAC PDU to be transmitted. In NR-U operation, if the UE can access to the channel as the result of LBT or if the UE gests the radio resource allocation for UL transmission from the serving gNB as the result of LBT or if the UE generates MAC PDU to be transmitted, the UE sets this time as T2 (e.g., step 941, 951). Then the UE generates MAC CE including the elapsed time stamp information between T2 and T1 (e.g., T2 minus T1) at step 961. This elapsed time stamp information can be indicated as the number of frames. Alternatively, this time stamp information can be indicated as the number of slots, subframes, milliseconds or seconds. Once the UE generated the above MAC CE, the UE transmits the MAC CE from step 961 and the measurement report message from step 931 together in the same MAC PDU over the allocated radio resource for UL transmission.

In one example, the gNB configures the threshold for the elapsed time stamp between T1 and T2 at step 901. The threshold can be indicated as the number of slots, subframes, frames, milliseconds or seconds. Then if T2 minus T1 at step 961 exceeds the configured threshold, the UE generate MAC CE including simple indication (e.g., 1 bit indication set as "0") to indicate the measured results included in the measurement report message is out-of-dated that exceeds the threshold. If T2 minus T1 at step 961 does not exceed the configured threshold, the UE generate MAC CE including simple indication (e.g., 1 bit indication set as "1") to indicate the measured results included in the measurement report message is not out-of-dated that does not exceed the threshold. Then the UE transmits this MAC CE and the measurement report message together in the same MAC PDU at step 971. Note alternatively 1 bit indication value can be interpreted in the other way round.

In one embodiment, elapsed time information can be expressed as the number of LBT failures. A UE's MAC sub-layer generates and multiplexes the MAC CE whenever signaling radio bearer 1 (SRB1) is sent.

Figure 10:
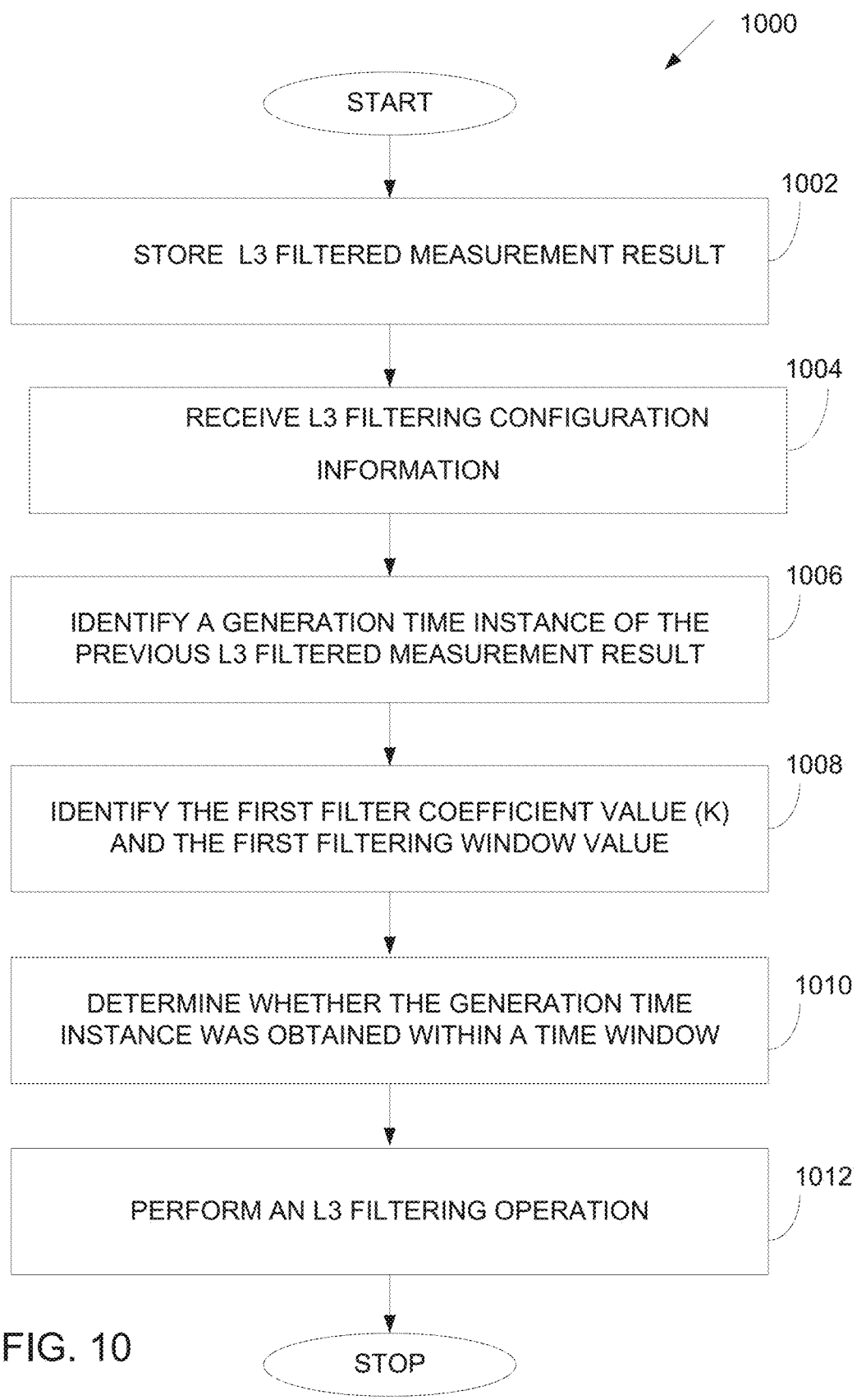
FIG. 10 illustrates a flow chart of a method for sidelink measurements in V2X communication according to embodiments of the present disclosure.

FIG. 10 illustrates a flow chart of a method 1000 for sidelink measurements in V2X communication according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions. The method as illustrated in FIG. 10 may be performed by a UE (e.g., 116 as illustrated in FIG. 1).

As illustrated in FIG. 10, the method 1000 begins at step 1002. In step 1002, a UE stores a previous L3 filtered measurement result.

In step 1004, the UE receives L3 filtering configuration information including a first filter coefficient value (k) and a first filtering window value.

In one embodiment, the L3 filtering configuration information further includes a second coefficient value (k') and a second filtering window value.

In step 1006, the UE identifies a generation time instance of the previous L3 filtered measurement result.

In step 1008, the UE identifies the first filter coefficient value (k) and the first filtering window value included in the L3 filtering configuration information.

In step 1010, the UE, in response to receiving a latest measurement result from a lower layer, determines whether the generation time instance of the previous L3 filtered measurement result was obtained within a time window that is a function of a first time instance and a second time instance.

In one embodiment, the first time instance is a current time instance and the second time instance is the current time instance minus the filtering window value, and the lower layer is a physical layer communicating with a higher layer that is a radio resource control (RRC) layer of the UE.

In step 1023, the UE performs an L3 filtering operation to trigger a measurement report based on a result of the determination.

In one embodiment, the UE performs the L3 filtering operation based on the received first filter coefficient value (k) if the generation time instance of the previous L3 filtered measurement result is obtained from the time window determined based on the first time instance and the second time instance.

In one embodiment, the UE sets the first filter coefficient value (k) as a zero and performs the L3 filtering operation based on the set first filter coefficient value (k) if the generation time instance of the previous L3 filtered measurement result is not obtained from the time window determined based on the first time instance and the second time instance.

In one embodiment, the UE identifies the L3 filtering configuration information from pre-configured information.

In one embodiment, the UE applies the first filter coefficient value (k) for the L3 filtering operation if the generation time instance of the previous L3 filtered measurement result is obtained from the time window determined based on the first time instance and the second time instance, and applies the second filter coefficient value (k') for the L3 filtering operation if the generation time instance of the previous L3 filtered measurement result is not obtained from the time window determined based on the first time instance and the second time instance.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) in a wireless communication system, the UE comprising:
    memory configured to store a previous layer 3 (L3) filtered measurement result;
    a transceiver operably connected to the memory, the transceiver is configured to receive L3 filtering configuration information including a first filter coefficient value (k) and a first filtering window value; and
    a processor operably connected to the transceiver, the processor configured to:
        identify a generation time instance of the previous L3 filtered measurement result,
        identify the first filter coefficient value (k) and the first filtering window value included in the L3 filtering configuration information,
        in response to receiving a latest measurement result from a lower layer, determine whether the generation time instance of the previous L3 filtered measurement result was obtained within a time window that is a function of a first time instance and a second time instance, and
        perform an L3 filtering operation to trigger a measurement report based on a result of the determination.

2. The UE of claim 1, wherein:
    the first time instance is a current time instance and the second time instance is the current time instance minus the first filtering window value; and
    the lower layer is a physical layer communicating with a higher layer that is a radio resource control (RRC) layer of the UE.

3. The UE of claim 1, wherein the processor is further configured to perform the L3 filtering operation based on the received first filter coefficient value (k) if the generation time instance of the previous L3 filtered measurement result is obtained from the time window determined based on the first time instance and the second time instance.

4. The UE of claim 1, wherein the processor is further configured to:
    set the first filter coefficient value (k) as zero; and
    perform the L3 filtering operation based on the set first filter coefficient value (k) if the generation time instance of the previous L3 filtered measurement result is not obtained from the time window determined based on the first time instance and the second time instance.

5. The UE of claim 1, wherein the processor is further configured to identify the L3 filtering configuration information from pre-configured information.

6. The UE of claim 1, wherein the L3 filtering configuration information further includes a second filter coefficient value (k') and a second filtering window value.

7. The UE of claim 6, wherein the processor is further configured to:
    apply the first filter coefficient value (k) for the L3 filtering operation if the generation time instance of the previous L3 filtered measurement result is obtained from the time window determined based on the first time instance and the second time instance; and
    apply the second filter coefficient value (k') for the L3 filtering operation if the generation time instance of the previous L3 filtered measurement result is not obtained from the time window determined based on the first time instance and the second time instance.

8. A user equipment (UE) in a wireless communication system, the UE comprising:
a transceiver configured to receive measurement configuration information; and
a processor operably connected to the transceiver, the processor is further configured to:
identify a first indicator included in the measurement configuration information, the first indicator indicating whether a system frame number (SFN) is included in a measurement report,
determine, based on the first indicator included in the measurement configuration information, whether the SFN is included in the measurement report, and
generate the measurement report based on a determination that the SFN is included in the measurement report, wherein the SFN is a current SFN that is determined when the measurement report is generated.

9. The UE of claim 8, wherein the transceiver is further configured to transmit the measurement report including the SFN and measurement result on serving and neighboring cells.

10. The UE of claim 8, wherein:
the processor is further configured to:
identify a second indicator included in the measurement configuration information, wherein the second indicator indicates whether to report an elapsed time stamp medium access control channel element (MAC CE),
determine, based on the second indicator being included in the measurement configuration information, whether to report the elapsed time stamp MAC CE, and
generate the measurement report including measurement results on serving and neighboring cells based on the measurement configuration information and the elapsed time stamp MAC CE based on a result of the determination; and
the transceiver is further configured to transmit the measurement report and the elapsed time stamp MAC CE.

11. The UE of claim 8, wherein the processor is further configured to calculate, based on the measurement report, an elapsed time to generate the elapsed time stamp MAC CE, the elapsed time being determined as a number of listen-before-talk (LBT) failures.

12. The UE of claim 8, wherein the processor is further configured to generate a transport block (TB) to transmit the measurement report and an elapsed time stamp MAC CE, the measurement report and the elapsed time stamp MAC CE are multiplexed in the TB.

13. The UE of claim 8, wherein the transceiver is further configured to transmit a signaling radio bearer (SRB) that is multiplexed with an elapsed time stamp MAC CE.

14. The UE of claim 8, wherein the transceiver is further configured to transmit an uplink transmission including the measurement report or an SRB in a listen-before-talk operation that is applied to avoid interference from neighbor UEs for the uplink transmission.

15. A method of a user equipment (UE) in a wireless communication system, the method comprising:
storing a previous layer 3 (L3) filtered measurement result;
receiving L3 filtering configuration information including a first filter coefficient value (k) and a first filtering window value;
identifying a generation time instance of the previous L3 filtered measurement result;
identifying the first filter coefficient value (k) and the first filtering window value included in the L3 filtering configuration information;
in response to receiving a latest measurement result from a lower layer, determining whether the generation time instance of the previous L3 filtered measurement result was obtained within a time window that is a function of a first time instance and a second time instance; and
performing an L3 filtering operation to trigger a measurement report based on a result of the determination.

16. The method of claim 15, wherein:
the first time instance is a current time instance and the second time instance is the current time instance minus the first filtering window value; and
the lower layer is a physical layer communicating with a higher layer that is a radio resource control (RRC) layer of the UE.

17. The method of claim 15, further comprising performing the L3 filtering operation based on the received first filter coefficient value (k) in accordance with a determination that the generation time instance of the previous L3 filtered measurement result is obtained from the time window determined based on the first time instance and the second time instance.

18. The method of claim 15, further comprising:
setting the first filter coefficient value (k) as a zero; and
performing the L3 filtering operation based on the set first filter coefficient value (k) in accordance with a determination that the generation time instance of the previous L3 filtered measurement result is not obtained from the time window determined based on the first time instance and the second time instance.

19. The method of claim 15, further comprising identifying the L3 filtering configuration information from pre-configured information, wherein the L3 filtering configuration information further includes a second filter coefficient value (k') and a second filtering window value.

20. The method of claim 19, further comprising:
applying the first filter coefficient value (k) for the L3 filtering operation based on a determination that the generation time instance of the previous L3 filtered measurement result is obtained from the time window determined based on the first time instance and the second time instance; and
applying the second filter coefficient value (k') for the L3 filtering operation based on a determination that the generation time instance of the previous L3 filtered measurement result is not obtained from the time window determined based on the first time instance and the second time instance.

* * * * *